(12) United States Patent
    Cao et al.

(10) Patent No.: US 12,272,033 B2
(45) Date of Patent: Apr. 8, 2025

(54) SNAPSHOT HYPERSPECTRAL IMAGING METHOD WITH DE-BLURRING DISPERSED IMAGES

(71) Applicant: NANJING UNIVERSITY, Jiangsu (CN)

(72) Inventors: Xun Cao, Jiangsu (CN); Ye Huang, Jiangsu (CN); Xia Hua, Jiangsu (CN); Xiaowen Li, Jiangsu (CN)

(73) Assignee: NANJING UNIVERSITY, Jiangsu (CN)

( * ) Notice: Subject to any disclaimer, the term of this patent is extended or adjusted under 35 U.S.C. 154(b) by 472 days.

(21) Appl. No.: 17/757,367

(22) PCT Filed: Jun. 9, 2020

(86) PCT No.: PCT/CN2020/095002
§ 371 (c)(1),
(2) Date: Jun. 15, 2022

(87) PCT Pub. No.: WO2021/135074
PCT Pub. Date: Jul. 8, 2021

(65) Prior Publication Data
US 2023/0021358 A1    Jan. 26, 2023

(30) Foreign Application Priority Data
Jan. 3, 2020 (CN) .......................... 202010006728.0

(51) Int. Cl.
    *G06T 5/73*        (2024.01)
    *G01J 3/28*        (2006.01)
    (Continued)

(52) U.S. Cl.
    CPC .............. *G06T 5/73* (2024.01); *G01J 3/2823* (2013.01); *G06T 7/74* (2017.01); *G06T 11/005* (2013.01);
    (Continued)

(58) Field of Classification Search
    CPC . G06T 5/73; G06T 7/74; G06T 11/005; G06T 2207/10024; G06T 2207/30204;
    (Continued)

(56) References Cited

U.S. PATENT DOCUMENTS

| 6,965,108 B2 | 11/2005 | Bynum et al. |
| 2012/0301016 A1* | 11/2012 | Zhu .................... H04N 9/646 382/162 |
| 2019/0096049 A1* | 3/2019 | Kim .................... G06T 5/60 |

FOREIGN PATENT DOCUMENTS

| CN | 107421640 A | 12/2017 |
| CN | 108291800 A | 7/2018 |

(Continued)

OTHER PUBLICATIONS

Wang, Feng et al.; "Super Resolution optic Three-dimensional Imaging Based on Compressed sensing", Acta Photonica Sinica; vol. 44, No. 3; Mar. 31, 2015, pp. 1-7.

*Primary Examiner* — Marcos L Torres
(74) *Attorney, Agent, or Firm* — NKL Law; Allen Xue

(57) ABSTRACT

A snapshot hyperspectral imaging method includes the steps of: S1, selecting a set of reference wavelengths for calibration, rectifying the shifted positions due to dispersion at each reference wavelength, and selecting a center wavelength; S2, estimating relative dispersion at each reconstructed wavelength with respect to the center wavelength; S3, generating a dispersion matrix describing the direction of dispersion, and generating a spectral response matrix using a spectral response curve of a sensor; S4, capturing images blurred with dispersion; S5, deblurring the dispersed images captured in S4 using the dispersion matrix and the spectral response matrix generated in S3 to obtain spectral data spatially aligned in all spectrums; and S6, projecting the aligned spectral data obtained in S5 into color space, extracting a foreground image by a threshold method, sampling the
(Continued)

dispersed images obtained in S4 as strong prior constraints for the foreground image, and reconstructing accurate spatial hyperspectral data.

7 Claims, 4 Drawing Sheets

(51) Int. Cl.
*G06T 7/73* (2017.01)
*G06T 11/00* (2006.01)

(52) U.S. Cl.
CPC . *G01J 2003/2826* (2013.01); *G01J 2003/283* (2013.01); *G06T 2207/10024* (2013.01); *G06T 2207/30204* (2013.01)

(58) Field of Classification Search
CPC ......... G06T 2207/30128; G06T 11/001; G06T 2207/10036; G01J 3/2823; G01J 3/12; G01J 2003/2826; G01J 2003/283; G01J 3/28
See application file for complete search history.

(56) References Cited

FOREIGN PATENT DOCUMENTS

| | | | |
|---|---|---|---|
| CN | 108961392 A | 12/2018 |
| CN | 109196333 A | 1/2019 |
| CN | 110501072 A | 11/2019 |
| CN | 111174912 A | 5/2020 |

\* cited by examiner (a)        (b)        (c)

(d)

(e)

SNAPSHOT HYPERSPECTRAL IMAGING METHOD WITH DE-BLURRING DISPERSED IMAGES

TECHNICAL FIELD OF THE INVENTION

The present invention belongs to the field of spectral imaging, and in particular relates to a snapshot hyperspectral imaging method with deblurring dispersed images.

BACKGROUND OF THE INVENTION

Hyperspectral imaging has wide application prospects in the fields of automatic material cutting and matching, material identification and geologic material monitoring, so it is very important in the fields of physical chemistry, agriculture and even military affairs. However, conventional hyperspectral imaging systems are usually complex in structure, require custom hardware for forming an optical path, and thus are bulky and expensive. Moreover, these custom devices can be used only after being manipulated and adjusted by professional engineering skills in a real-time manner, so these systems are not affordable, user-friendly or practical for ordinary users.

Conventional scanning systems can take measurements at each wavelength separately by filters but slowly, and the spectral resolution is limited by the type and number of filters used. In some other spectral imaging techniques, such as Coded Aperture Snapshot Spectral Imaging (CASSI), the system encodes images by a coded aperture mask, produces dispersion by a prism, and reconstructs spectral information by compressed images obtained after being encoded and dispersed. Moreover, a spatially invariant dispersion model is adopted in the reconstruction technique, thus the optical path is required to be collimated, and the system is relatively complex.

SUMMARY OF THE INVENTION

In view of the above defects in the prior art, an objective of the present invention is to provide a snapshot hyperspectral imaging method with deblurring dispersed images, which can realize high-accurate hyperspectral imaging by a simple, portable and low-cost system.

A technical solution employed by the present invention to achieve the objective is as follows.

The present invention provides a snapshot hyperspectral imaging method with deblurring dispersed images using a device capable of dispersing incident light and a sensor configured to capture images dispersed by the device, including following steps of: S1, selecting a set of reference wavelengths for calibration, rectifying the shifted positions due to dispersion at each reference wavelength, and selecting a center wavelength; S2, estimating relative dispersion of each reconstructed wavelength with respect to the central wavelength; S3, generating a dispersion matrix describing the direction of dispersion based on the dispersion results estimated in the S2, and generating a spectral response matrix using a spectral response curve of the sensor; S4, capturing images blurred with dispersion; S5, deblurring the dispersed images captured in the S4 using the dispersion matrix and the spectral response matrix generated in the S3 to obtain spectral data aligned in all spectrums; S6, projecting the aligned spectral data obtained in the S5 into color space, extracting a foreground image by a threshold method, sampling the dispersed images obtained in the S4 as strong prior constraints for the foreground image, and reconstructing accurate spatial hyperspectral data.

Further rectifying dispersion at the reference wavelength in the S1 includes following steps of: when rectifying dispersion at a certain wavelength, putting a filter of that wavelength in front of an optical source so that only light beams of that wavelength are allowed to pass through the filter, and then marking the position of a reference object in image.

Further, estimating relative dispersion at each reconstructed wavelength with respect to the center wavelength in the S2 includes following steps of: acquiring the relative dispersion at each reference wavelength with respect to the center wavelength based on the measured shifted positions due to dispersion at all reference wavelengths and the selected center wavelength, and interpolating to obtain the relative dispersion at all other reconstructed wavelengths with respect to the center wavelength.

Further, generating a dispersion matrix describing the direction of dispersion in the S3 includes following steps of: setting the spatial hyperspectral data as i with dimensions of xyΛ×1, where x and y represent transverse and longitudinal dimensions of a 2D image, and Λ is the number of spectral channels, and setting the dispersion matrix as Ω with dimensions of xyΛ×xyΛ to obtain a dispersed spectral matrix S=Ωi, where there is no translation in a center wavelength channel, and the relative translation in other wavelength channels is consistent with the data obtained in the S2, and constructing a dispersion matrix Ω based on the dispersed spectral matrix S and the spatial hyperspectral data i.

Further, generating a spectral response matrix in the S3 includes following steps of: setting the spectral response matrix as Φ with dimensions of xyN×xyΛ, where x and y represent transverse and longitudinal dimensions of a 2D image, Λ is the number of spectral channels, and N is 3 or 1, projecting the spatial hyperspectral data i into corresponding color space to obtain R=Φi with dimensions of xyN×1, querying the response curve φ=N×Λ of the sensor and sampling to obtain response values of the sensor at the reconstructed spectral wavelengths, and constructing a spectral response matrix φ based on i, R and φ.

Further, the S5 specifically includes a step of: solving $$i_{aligned} = \operatorname*{argmin}_{i} \|\Omega\Phi i - j\|_2^2 + \alpha_1 \|\nabla_{xy} i\|_1 + \beta_1 \|\nabla_\lambda \nabla_{xy} i\|_1,$$

where $i_{aligned}$ represents the obtained spectral data aligned with all channels, Ω is the dispersion matrix describing the direction of dispersion, Φ is the spectral response matrix, i represents the spatial hyperspectral data, j represents dispersed images actually captured, $\nabla_{xy}$ is the spatial gradient, $\nabla_\lambda$ is the gradient in the spectral dimension, and $\alpha_1$ and $\beta_1$ are the coefficients of constraint terms, respectively.

Further, the S6 specifically includes following steps of:
obtaining deblurred image $\Phi i_{aligned}$, and extracting a foreground image $i_{front}$ which is a binary matrix with dimensions of x×y using a proper threshold, where x and y represent transverse and longitudinal dimensions of a 2D image; sampling the blurred images after dispersion captured in the S4 respectively in the dispersion direction with each pixel as a center, and taking each sampled vector as a prior of a spectral value at the corresponding pixel in each channel to finally obtain a spectral prior $i_{prior}$ with dimensions of x×y×Λ of all pixels; solving $$i_{recons} = \operatorname*{argmin}_{i} \|\Omega\Phi i - j\|_2^2 + \gamma\|W \cdot (i - i_{prior})\|_2^2 + \alpha_2 \|\nabla_{xy} i\|_1 + \beta_2 \|\nabla_\lambda \nabla_{xy} i\|_1,$$

where $i_{recons}$ represents the final hyperspectral data, W is a weight matrix with dimensions of x×y×Λ, which means that the foreground images in all spectrums are constrained, consisting of $i_{front}$ in each spectrum, and γ and $α_2$ and $β_2$ are adjustment coefficients for each term.

The present invention has the following significant advantages.

(1) The hyperspectral imaging method in the present invention can perform low-cost hyperspectral video imaging merely by a simple sensor and a device capable of dispersing incident light, including but not limited to meta-lens and a prism.

(2) Without a need to take measurements at each wavelength separately as in the case of the scanning system, the method in the present invention is faster. Since the imaging model and system are simplified, the hyperspectral data can be reconstructed easily using software alone, and the accuracy of the reconstructed data is ensured by the method of strong prior constraints.

DETAILED DESCRIPTION OF THE INVENTION

Figure 1:
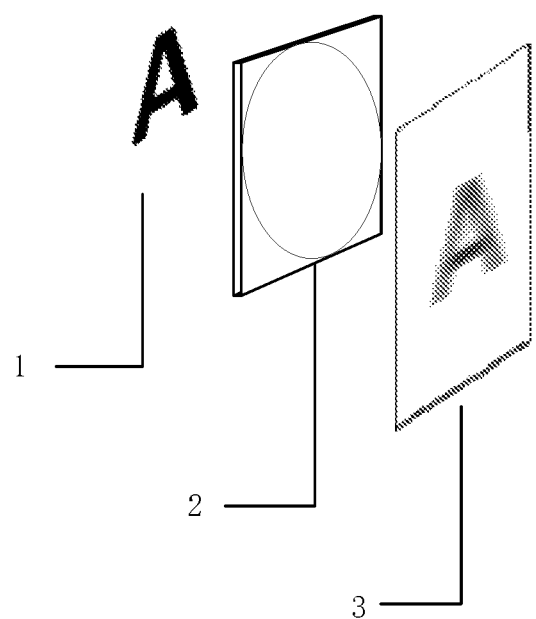
FIG. 1 is a structural diagram of a device adopted in the present invention, in which 1—sample, 2—device capable of dispersing incident light, and 3—sensor.

As shown in FIG. 1, an imaging device used in this embodiment includes a device 2 capable of dispersing incident light and a sensor 3. A sample 1 is put in front of the device 2 capable of dispersing incident light, and the sensor 3 is put behind the device 2 and captures images dispersed by the device of the sample. The device 2 capable of dispersing incident light includes, without limitation, meta-lens and a prism.

Figure 2:
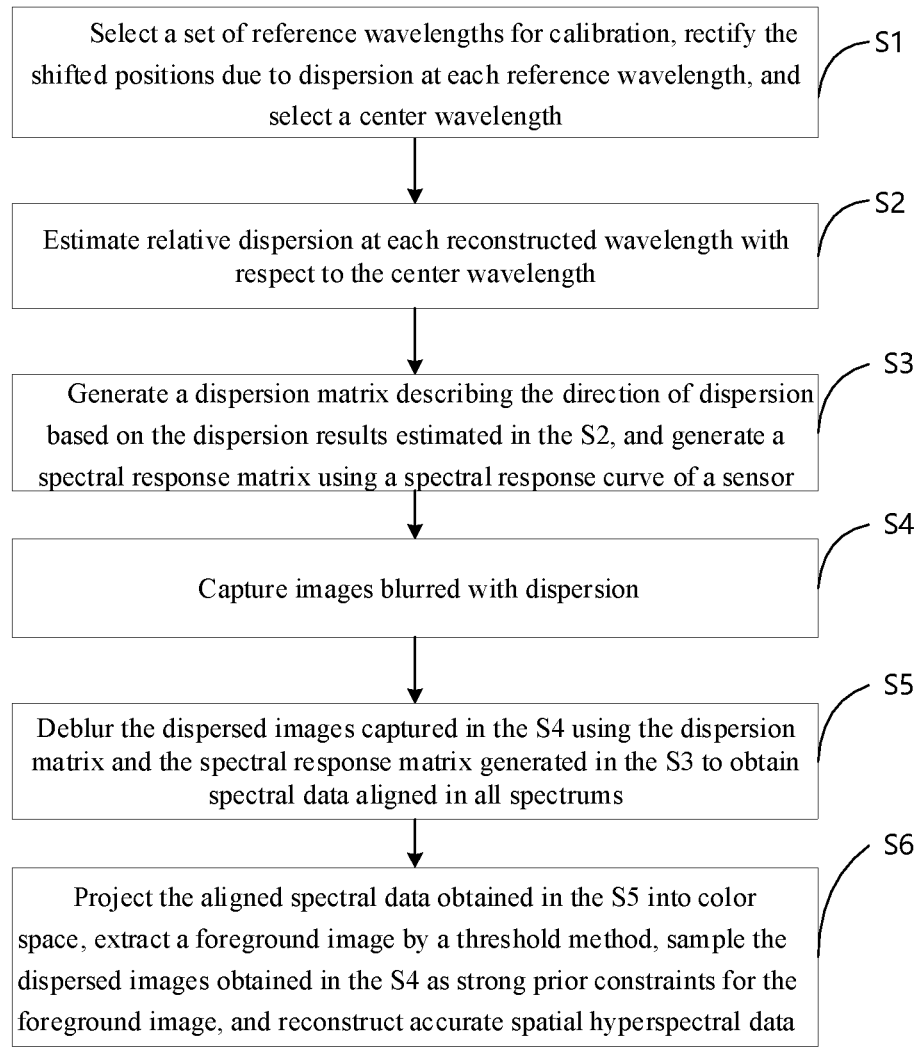
FIG. 2 is a flowchart of a method according to the present invention.
Figure 3:
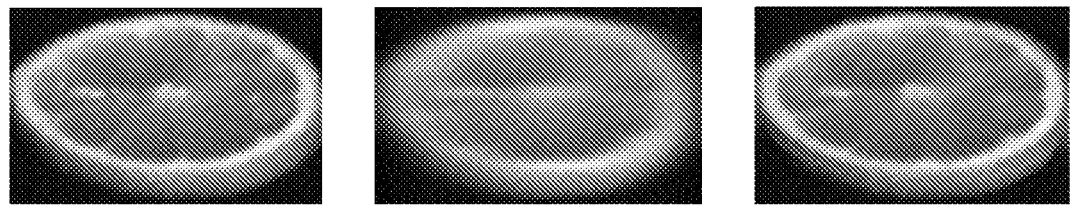
FIG. 3 shows hyperspectral results reconstructed with simulation data by the method according to the present invention, in which (a) an original image; (b) a simulated and dispersed image; (c) a reconstructed image; (d) comparison between an original spectral curve and a reconstructed spectral curve of a first pixel randomly selected, and (e) comparison between an original spectral curve and a reconstructed spectral curve of a second pixel randomly selected.
Figure 3:
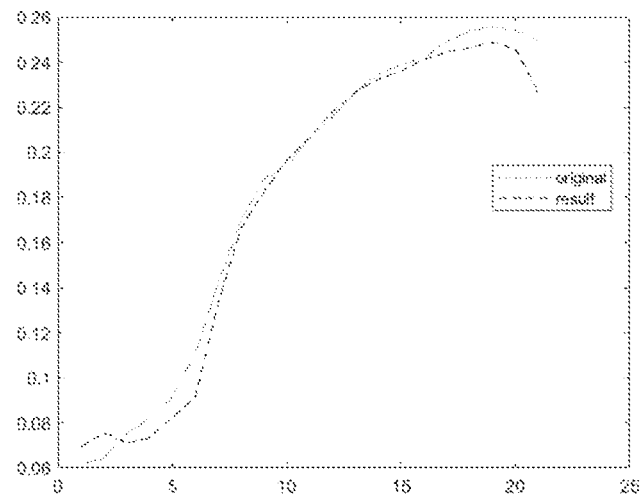
Figure 3:
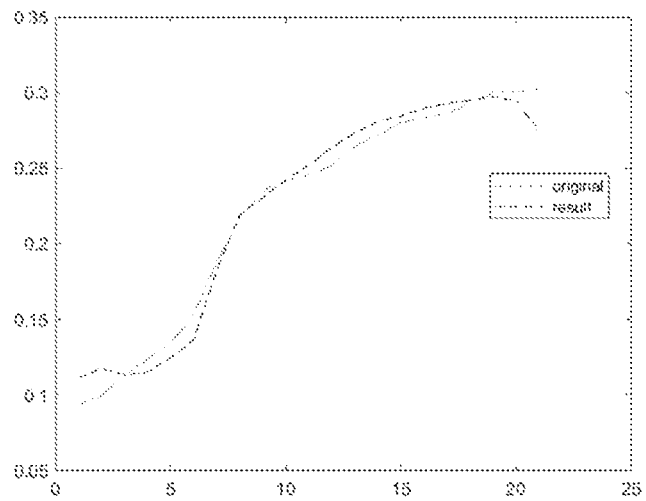
Figure 4:
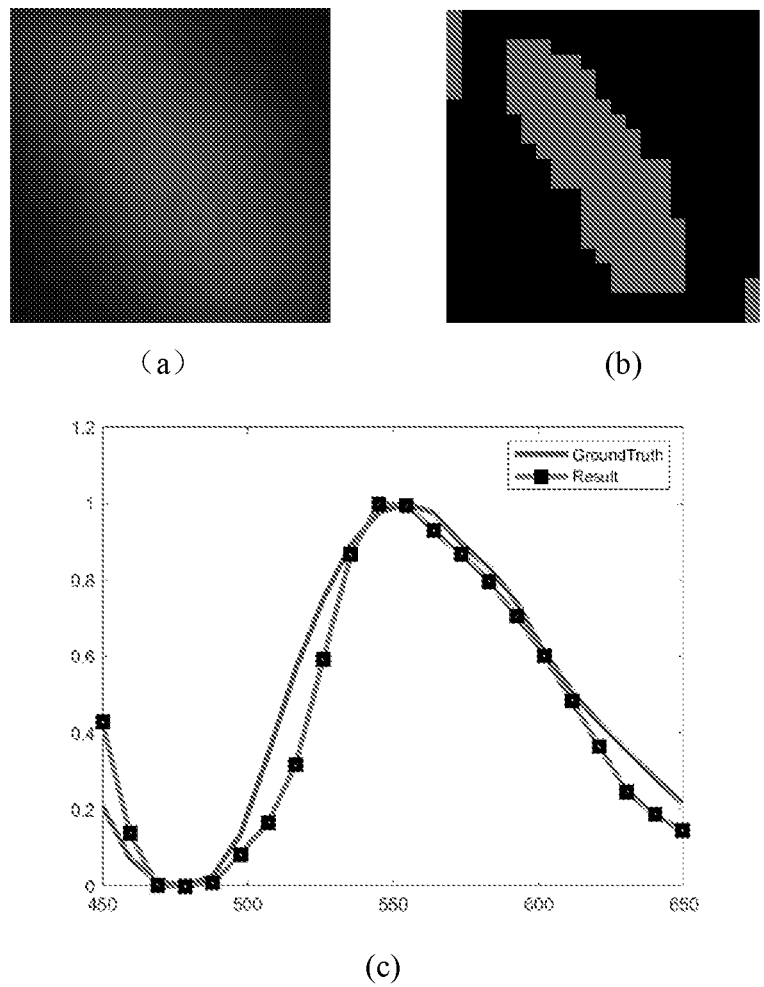
FIG. 4 shows a dispersed image captured by the device according to the present invention and an image reconstructed by the method according to the present invention, in which (a) a dispersed image captured; (b) a reconstructed image; and (c) comparison between a reconstructed spectral curve of pixels in 22 channels and an original spectral curve, where the X-axis represents wavelengths in nm, and the Y-axis represents normalized pixel values.

With reference to FIG. 2, a hyperspectral imaging method based on dispersion according to the present invention is provided, including following steps of acquiring aligned spatial spectral data using a proposed dispersion model, i.e., j=ΩΦi, where j represents dispersed images captured by the sensor, Ω is a spectral response matrix, Φ is a spatial dispersion matrix, and i represents spatial hyperspectral data, as well as a gradient sparsity constraint and constraints aligned with data of all channels, to deblur images after spatial dispersion, and then reconstructing accurate spectral data using the pixels with sampled strong prior constraints. The method includes following specific steps S1 to S6.

In the S1, reference wavelengths are selected, assuming that an optical source emits white beams with wavelengths of 450 nm to 650 nm, the reference wavelengths may be 450 nm, 500 nm, 550 nm, 600 nm and 650 nm, and the dispersion is rectified at these reference wavelengths respectively. To rectify the dispersion at a certain wavelength, a filter of that wavelength is put in front of the optical source so that only light beams of that wavelength are allowed to pass through the filter, and then position of a reference object in image is marked to obtain coordinates located approximately in a straight line of the reference object at all wavelengths. A center wavelength of 550 nm may be selected.

In the S2, relative dispersion at each reconstructed wavelengths with respect to the center wavelength is estimated based on the data obtained in the S1. When the center wavelength of 550 nm is selected, relative displacements at other reference wavelengths to an imaging center at 550 nm can be obtained, such as +13 pixels at the wavelength of 650 nm, +6 pixels at the wavelength of 600 nm, −4 pixels at the wavelength of 500 nm and −8 pixels w at the wavelength of 450 nm, and the relative dispersion at other reconstructed wavelengths with respect to the center wavelength can be obtained by interpolation, e.g., the relative displacement of 6 pixels is obtained at the wavelength of 550 nm to 600 nm, so the wavelengths represented by five median pixel displacements can be rectified, namely 550 nm, 550+50/6 nm, 550+50/6*2 nm, 550+50/6*3 nm, 550+50/6*4 nm, 550+50/6*5 nm and 550+50/6*6=600 nm. Of course, the more wavelengths are rectified, the more wavelength channels are reconstructed, and the more difficult it is to deblur images.

In the S3, a dispersion matrix is generated based on the data obtained in the S2: the spatial hyperspectral data are set as i with dimensions of xyΛ×1, x and y represent dimensions of a 2D image, Λ is the number of spectral channels, and the original data are x×y×Λ, which are reconstructed into column vectors with columns first followed by wavelength channels. The dispersion matrix is set as Ω with dimensions of xyΛ×xyΛ, and a spectral vector S=Ωi after dispersion is obtained by computing. There is no translation in a center wavelength channel, and the relative translation in other wavelength channels is consistent with the data obtained in the S2.

Taking one-dimensional data as an example (assuming an image size is 1×5), if the values of the center wavelength channel are $a_0$, $b_0$, $c_0$, $d_0$ and $e_0$, the values of the channels with a relative displacement of −1 pixel are $b_{-1}$, $c_{-1}$, $d_{-1}$, $e_{-1}$ and 0, and the values of the channels with a relative displacement of +1 pixel are 0, $a_1$, $b_1$, $c_1$, $d_1$ and so on to obtain the spectral matrix after dispersion, which are reconstructed into a column vector with columns first followed by wavelength channels to obtain S. Ω can be constructed according to the relationship between S and i. The method of generating a response matrix includes following steps of: setting the spectral response matrix as Φ with dimensions of xyN×xyΛ, where N is 3 or 1 (depending on a color sensor or grayscale sensor), projecting the spatial hyperspectral data into corresponding color space to obtain R=Φi with dimensions of xyN×1, querying a response curve φ=N×Λ of the sensor, and constructing a response matrix Φ based on i, R and φ.

In the S4, an optical source the same as that in the S1 is adopted to capture images. With the device 2 capable of dispersing incident light, the images are dispersed in plane and blurred.

In the S5, the dispersed images captured in the S4 are de-blurred using the dispersion matrix and the spectral response matrix generated in the S3 to obtain spectral data aligned with images in all channels.

$$i_{aligned} = \underset{i}{\operatorname{argmin}} \|\Omega \Phi i - j\|_2^2 + \alpha_1 \|\nabla_{xy} i\|_1 + \beta_1 \|\nabla_\lambda \nabla_{xy} i\|_1$$

is solved, where $i_{aligned}$ represents the obtained spectral data aligned in all spectrums, j represents the dispersed images actually captured, $\nabla_{xy}$ is the spatial gradient, $\nabla_\lambda$ is the gradient in the spectral dimension, and $\alpha_1$ and $\beta_1$ are the coefficient of constraint terms, respectively. The gradient computation can be expressed by matrix computation. The first item of the equation is a data term, which reduces the mean square error between results obtained by the model and the actual data. The last two terms are prior terms of which factors need to be adjusted as the case may be, where the second term is a variable differential operator commonly used, which reduces the spatial gradient artifact, and the third term ensures the alignment in all spectrums. Optimization can be realized by ADMM algorithm, which can be divided into three sub-problems:

$$f(i)=\|\Omega\Phi i-j\|_2^2, g(z_1)=\alpha_1\|z_1\|_1, \text{ and } h(z_2)=\beta_1\|z_2\|_1.$$

The objective optimization is transformed into:

$$\min_{i,z_1,z_2} f(i) + g(z_1) + h(z_2)$$

subject to $\nabla_{xy} i - z_1 = 0, \nabla_\lambda \nabla_{xy} i - z_2 = 0$

The variables are iteratively optimized by the ADMM algorithm, namely:

$$i^{k+1} = \underset{i}{\operatorname{argmin}} f(i) + \frac{\rho_1}{2}\|\nabla_{xy} i - z_1^k + u_1^k\|_2^2 + \frac{\rho_2}{2}\|\nabla_\lambda \nabla_{xy} i - z_2^k + u_2^k\|_2^2$$

$$z_1^{k+1} = \underset{z_1}{\operatorname{argmin}} g(z_1) + \frac{\rho_1}{2}\|\nabla_{xy} i^{k+1} - z_1 + u_1^k\|_2^2$$

$$z_2^{k+1} = \underset{z_2}{\operatorname{argmin}} h(z_2) + \frac{\rho_2}{2}\|\nabla_\lambda \nabla_{xy} i^{k+1} - z_2 + u_2^k\|_2^2$$

$$u_1^{k+1} = u_1^k + \nabla_{xy} i^{k+1} - z_1^{k+1}$$

$$u_2^{k+1} = u_2^k + \nabla_\lambda \nabla_{xy} i^{k+1} - z_2^{k+1}$$

where $u_1$ and $u_2$ are Lagrange multipliers, only the term $l_2$ of $i^{k+1}$ is solved by a conjugate gradient method, and the introduced variables $z_1$ and $z_2$ are solved by a soft threshold operator, as follows:

$$z_1^{k+1} = ST\left(\frac{\alpha_1}{\rho_1}, u_1^k + \nabla_{xy} i^{k+1}\right)$$

$$z_2^{k+1} = ST\left(\frac{\beta_1}{\rho_2}, u_2^k + \nabla_\lambda \nabla_{xy} i^{k+1}\right)$$

$$ST(\theta, X) = \begin{cases} X - \theta, & X > \theta \\ 0, & |X| \leq \theta \\ X + \theta, & X < -\theta \end{cases}$$

The Lagrange multipliers $u_1$ and $u_2$ are updated by a gradient ascent method.

In the S6, the aligned spectral data obtained in the S5 are projected into color space (RGB space or grayscale space depending on a color sensor or grayscale sensor), i.e., obtaining deblurred image $\Phi i_{aligned}$, and extracting a foreground image $i_{front}$ which is a binary matrix with dimensions of x×y using a proper threshold. The blurred images after dispersion captured in the S4 are sampled respectively in the dispersion direction with each pixel as a center. Because each image sampled can be considered as a result of mixing fewer channels, it can be used as a prior of the spectral value at the corresponding pixel in each channel to finally obtain a spectral prior $i_{prior}$ with dimensions of x×y×Λ of all pixels. Finally, $$i_{recons} = \underset{i}{\operatorname{argmin}} \|\Omega\Phi i - j\|_2^2 + \gamma \|W \cdot (i - i_{prior})\|_2^2 + \alpha_2 \|\nabla_{xy} i\|_1 + \beta_2 \|\nabla_\lambda \nabla_{xy} i\|_1$$

is solved, where $i_{recons}$ represents the final hyperspectral data, W is a weight matrix with dimensions of x×y×Λ, which means that the foreground images in all spectrums are constrained, consisting of $i_{front}$ in each spectrum, and $\gamma$, $\alpha_2$ and $\beta_2$ are adjustment coefficients for each term. In optimization, the first two terms can be considered as data terms, $\gamma$ represents the credibility of strong priors, which may be a large value. The third and fourth terms are the same as above, and the value of $\beta$ is generally $1e^{-3}$ to $1e^{-1}$, while the value of $\alpha$ is about $1e^{-5}$, which needs to be adjusted as the case may be.

The invention claimed is:

1. A snapshot hyperspectral imaging method with deblurring dispersed images using a device capable of dispersing incident light and a sensor configured to capture images dispersed by the device capable of dispersing incident light, wherein in the method comprises the steps of:
    S1, selecting a set of reference wavelengths for calibration, rectifying the shifted positions due to dispersion at each reference wavelength, and selecting a center wavelength;
    S2, estimating relative dispersion at each reconstructed wavelength with respect to the center wavelength;
    S3, generating a dispersion matrix describing the direction of dispersion based on the dispersion results estimated in the S2, and generating a spectral response matrix using a spectral response curve of the sensor;
    S4, capturing images blurred with dispersion;
    S5, deblurring the dispersed images captured in the S4 using the dispersion matrix and the spectral response matrix generated in the S3 to obtain spectral data spatially aligned in all spectrum; and
    S6, projecting the aligned spectral data obtained in the S5 into color space, extracting a foreground image by a threshold method, sampling the dispersed images obtained in the S4 as strong prior constraints for the foreground image, and reconstructing accurate spatial hyperspectral data.

2. The snapshot hyperspectral imaging method with deblurring dispersed images according to claim 1, wherein rectifying the shifted positions due to dispersion at each reference wavelength in S1 further comprises: when rectifying the shifted positions due to dispersion at a certain wavelength, putting a filter of that wavelength in front of an optical source so that only light beams of that wavelength are allowed to pass through the filter, and then marking the position of a reference object in image.

3. The snapshot hyperspectral imaging method with deblurring dispersed images according to claim 1, wherein estimating relative dispersion at each reconstructed wavelength with respect to the center wavelength in S2 further comprises: acquiring the relative dispersion at each reference wavelength with respect to the center wavelength based on the measured shifted positions due to dispersion at all reference wavelengths and the selected center wavelength, and interpolating to obtain the relative dispersion at all other reconstructed wavelengths with respect to the center wavelength.

4. The snapshot hyperspectral imaging method with deblurring dispersed images according to claim 1, wherein generating a dispersion matrix describing the direction of dispersion in S3 further comprises: setting the spatial hyperspectral data as i with dimensions of xyΛ×1, wherein x and y represent a transverse dimension and a longitudinal dimension of a 2D image, respectively, and Λ is the number of spectral channels, setting the dispersion matrix as Ω with dimensions of xyΛ×xyΛ to obtain a dispersed spectral matrix S=Ωi, wherein there is no translation in the center wavelength, and the relative translation in other wavelength is consistent with the data obtained in S2, and constructing a dispersion matrix Ω based on the dispersed spectral matrix S and the spatial hyperspectral data i.

5. The snapshot hyperspectral imaging method with deblurring dispersed images according to claim 1, wherein generating a spectral response matrix in S3 further comprises: setting the spectral response matrix as Φ with dimensions of xyN×xyΛ, wherein x and y represent a transverse dimension and a longitudinal dimension of a 2D image, respectively, Λ is the number of spectral channels, and N is 3 or 1, projecting the spatial hyperspectral data i into corresponding color space to obtain R=Ωi with dimensions of xyN×1, querying the response curve φ=N×Λ of the sensor and sampling to obtain response values of the sensor at the reconstructed spectral wavelengths, and constructing a spectral response matrix Φ based on i, R and φ.

6. The snapshot hyperspectral imaging method with deblurring dispersed images according to claim 1, wherein S5 further comprises:
solving $$i_{aligned} = \underset{i}{\mathrm{argmin}} \|\Omega\Phi i - j\|_2^2 + \alpha_1 \|\nabla_{xy} i\|_1 + \beta_1 \|\nabla_\lambda \nabla_{xy} i\|_1,$$

wherein $i_{aligned}$ represents the obtained spectral data aligned in all spectrum, Ω is the dispersion matrix describing the direction of dispersion, Φ is the spectral response matrix, i represents the spatial hyperspectral data, j represents dispersed images actually captured, $\nabla_{xy}$ is the spatial gradient, $\nabla_\lambda$ is the gradient in the spectral dimension, and $\alpha_1$ and $\beta_1$ are the coefficients of constraint terms, respectively.

7. The snapshot hyperspectral imaging method with deblurring dispersed images according to claim 1, wherein in the S6 specifically comprises:
obtaining deblurred image $\Phi i_{aligned}$, and extracting a foreground image $i_{front}$ which is a binary matrix with dimensions of x×y using a proper threshold, wherein x and y represent a transverse dimension and a longitudinal dimension of a 2D image, respectively;
sampling the blurred images captured in the S4 in the dispersion direction with each pixel as a center, and taking each sampled vector as a prior of a spectral value at the corresponding pixel in each spectrum to finally obtain a spectral prior $i_{prior}$ with dimensions of x×y×Λ of all pixels; and
solving $$i_{recons} = \underset{i}{\mathrm{argmin}} \|\Omega\Phi i - j\|_2^2 + \gamma \|W \cdot (i - i_{prior})\|_2^2 + \alpha_2 \|\nabla_{xy} i\|_1 + \beta_2 \|\nabla_\lambda \nabla_{xy} i\|_1,$$

wherein $i_{recons}$ represents the final reconstructed hyperspectral data, W is a weight matrix with dimensions of x×y×Λ, wherein the foreground images in all spectrums are constrained, consisting of $i_{front}$ in each spectrum, and γ, $\alpha_2$ and $\beta_2$ are adjustment coefficients for each term.

* * * * *